Jan. 2, 1951        L. J. WINCHELL        2,536,481
BEARING MOUNTING FOR LAWN MOWER CUTTER BLADES
Original Filed May 28, 1947
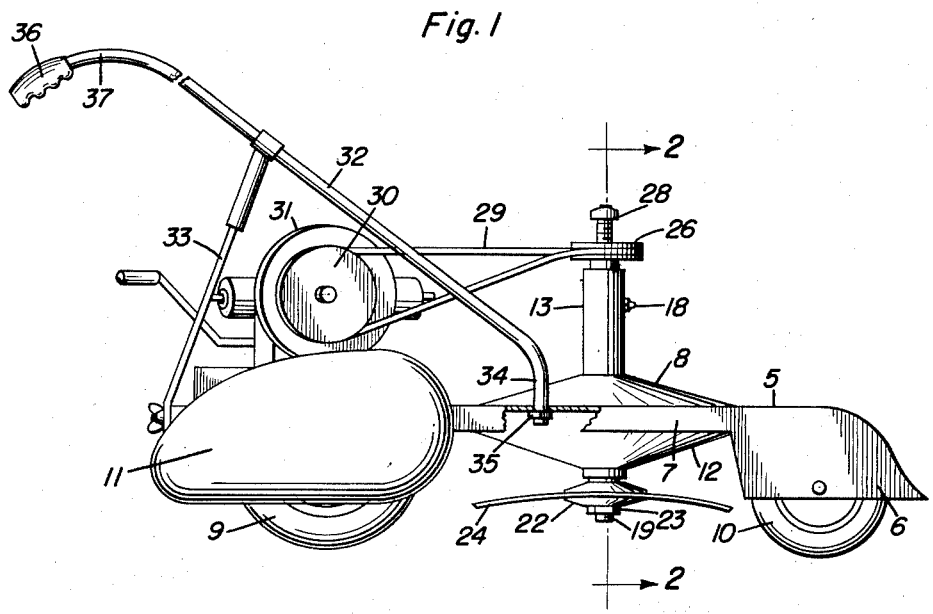
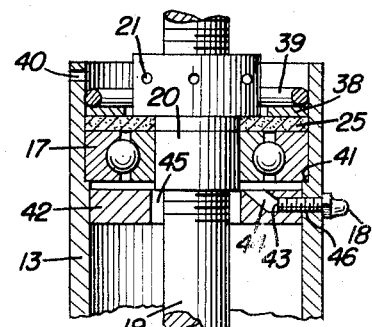
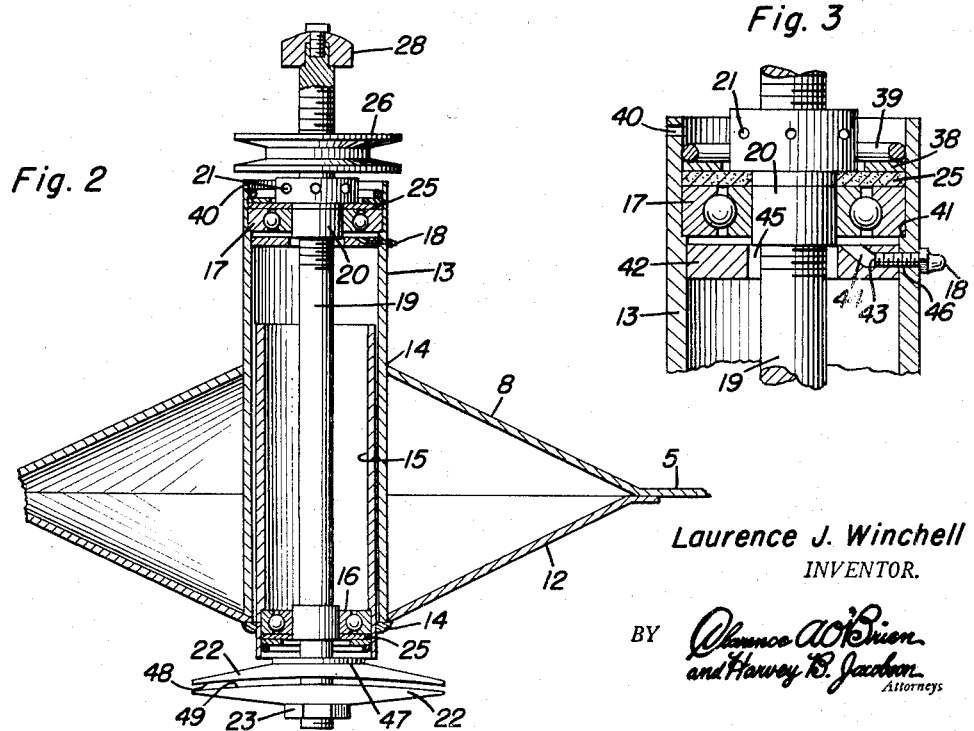
Laurence J. Winchell
INVENTOR.

Patented Jan. 2, 1951

2,536,481

UNITED STATES PATENT OFFICE 2,536,481

BEARING MOUNTING FOR LAWN MOWER CUTTER BLADES

Laurence J. Winchell, Fort Scott, Kans.

Original application May 28, 1947, Serial No. 750,915. Divided and this application October 7, 1949, Serial No. 124,764

7 Claims. (Cl. 308—230)

This invention relates to improvements in lawn mowers of the type disclosed in my U. S. Letters Patent No. 2,259,676, dated October 21, 1941, wherein there is provided a motor driven elongated cutting blade which rotates about a vertical axis beneath a wheeled platform, and is a division of my copending application, Serial No. 750,915, filed May 28, 1947, and now matured into Patent No. 2,484,201 of October 11, 1949.

The primary object of the present invention is to provide novel and improved means for mounting the shaft of the cutting blade so as to effectively brace the same in a truly vertical position and to provide for vertical adjustment thereof so as to vary the distance between the cutting blade and the ground and thereby regulate the height at which the grass or other growth is cut relative to the ground.

A further object of the invention is to provide the mower with an improved form of handle and means for vertically adjusting the rear or hand grip portion thereof to suit the requirements of the particular person using the lawn mower.

A still further object is to provide an improved cutter shaft lubricating means.

And a final object of the invention to be specifically enumerated herein, is to effect a dirt seal between the cutter blade assembly and the lower end of the vertical housing.

The exact nature of the present invention, as well as more specific objects and features thereof, will become apparent from the following description when considered in connection with the accompanying drawing, in which:

Figure 1 is a side elevation view, partly broken away and in section, of a lawn mower constructed in accordance with the present invention;

Figure 2 is an enlarged fragmentary view partly in elevation and partly in section on the plane of line 2—2 of Figure 1; and, Figure 3 is an enlarged detail view in vertical section showing more clearly the lubricating structure.

Referring in detail to the drawing, 5 indicates a horizontal elongated sheet metal platform which is stamped or pressed to have integral front wheel guards 6, depending side and end flanges 7, and an upwardly dished portion 8 intermediate the ends and midway between the sides of the platform. The rear end of the platform is supported by co-axial rear wheels 9, while the front end of the platform is supported by co-axial front wheels 10 as disclosed in my abovementioned patent. Suitable guards for the rear wheels 9 are attached to opposite sides of the platform 5 as indicated at 11.

Welded or otherwise rigidly secured to the underside of platform 5 coincident with the upwardly dished portion 8 of the latter is a downwardly dished sheet metal disk 12 of a form and size similar to the dished portion 8. The portion 8 and disk 12 have central vertically aligned openings through which extend a vertical supporting sleeve 13, the sleeve 13 snugly fitting the openings and being welded to the portion 8 and disk 12 as indicated at 14. The sleeve 13 is thus effectively braced in a truly vertical position so as to provide a rigid durable construction that effectively resists displacement of the sleeve 13 from its truly vertical position. Snugly fitted in the lower portion of the sleeve 13 for vertical sliding adjustment therein is a second shorter sleeve 15 having a ball bearing 16 mounted in the lower shouldered portion thereof. A further ball bearing 17 is mounted in the upper shouldered end portion of the longer outer sleeve 13, and the latter is provided at a point between the bearing 17 and the upper end of sleeve 15 with a grease fitting 18 to facilitate the introduction of lubricant within said sleeves 13 and 15, whereby to keep the bearings 16 and 17 effectively lubricated in a manner to be set forth hereinafter.

A shaft 19 extends through the sleeves 13 and 15 and has the inner races of the bearings 16 and 17 secured thereon to turn therewith. Adjustably threaded on the upper end portion of shaft 19 is a nut member or collar 20 on which the inner race of the upper bearing 17 is secured as by a press fit. The collar 20 has apertures 21 for engagement by a suitable tool for holding the nut member 20 against turning, and whereby simultaneously rotating shaft 19, the latter may be vertically adjusted therein.

Secured on the projecting lower end of shaft 19 between a pair of clamping plates 22, and whose adjacent surfaces are respectively concaved and convexed as shown in an exaggerated manner in Figure 2, by means of a clamping nut 23, is an elongated cutting blade 24. It will thus be seen that by adjusting shaft 19 vertically in the nut 20, the distance of the cutting blade 24 from the ground may be varied to cut the growth or grass at a selected height above the ground. The uppermost plate 22 is of sufficient diameter to overlap or cover and shield the lower end of sleeve 15 to prevent grass or dirt entering the bearing.

Suitable grease retainers are provided at 25 within the tube 13 above bearing 17 and within the tube 15 below the bearing 16. These retainers are of identical construction and as shown in Figure 3, includes packing member 25, a washer 38 and a split retaining ring seated in an annular groove in the two sleeves.

Adjustably threaded on the projecting upper portion of shaft 19 is a pulley 26 which may be screwed down upon the shaft until it abuts the collar 20 and acts as a lock nut therefor. When so locked, the pulley becomes a driving means for rotating the shaft. By unscrewing the pulley, the collar 20 is released and the shaft is free to rotate relative to the supporting collar. A suitable knob or handle 28 is removably secured upon the upper end of shaft 19 for use in turning the latter when effecting its vertical adjustment, the pulley being released as above mentioned. An endless belt 29 passes around the pulley 26 and also around a pulley 30 secured on the drive shaft of a motor or engine 31 which is mounted on the rear portion of platform 5. Thus, the motor or engine 31 is used to drive the cutting blade 24 while the lawn mower is pushed ahead during the mowing operation. Such motor or engine may be suitably controlled to regulate the speed of rotation of the cutting blade while the mower is in use. The cutting blade 24 is provided with suitable cutting edges at opposite sides of opposite ends thereof, and it is preferably of slightly upwardly bowed form as shown, this flexing or bowing of the blade being assisted by the above described concave and convex surface of the nuts 22.

An upwardly and rearwardly extending handle-bar 32 is attached to the platform 5 adjacent each side of the latter, and the intermediate portion of each handle-bar is connected with the rear end of the platform 5 by means of a brace 33. Each handle-bar has a downwardly directed forward end portion 34 which is bolted through the platform 5 as at 35 in front of the rear wheels 9. By adjusting the length of the brace 33, the associated handle-bar 32 may be flexed vertically so as to adjust the height of the rear or hand grip portion 36 of said handle relative to the ground to suit the particular requirements of the particular person using the lawn mower. The handle-bars may be connected or braced near their rear ends as generally taught in my above-mentioned patent, the connecting cross member or brace being denoted by dotted lines at 37 in Figure 1.

Assuming that the cutting blade 24 is in the raised position shown in the drawing, and that it is desired to adjust the same downwardly, the pulley 26 is adjusted upwardly by rotating the same while holding the shaft 19 stationary thereby releasing the collar 20 for rotation on shaft 19. A suitable tool is inserted through an aperture 49 of sleeve 13 and engaged in bores 21 of collar 20 to secure the latter against rotation. The shaft 19 is then rotated relative to nut member or collar 20 so as to adjust the shaft 19 downwardly to the required distance. The pulley 26 is then tightened into locking engagement with collar 20 so that the cutting blade is maintained in the required adjusted position relative to the ground. A reversal of this operation will of course effect a desired elevation of the cutter 24 from a lowered adjusted position.

As shown best in Figure 3 the sleeve 13 has an internal shoulder 41 upon which the outer race of bearing 17 seats and is retained by the engagement of the sealing means above set forth. A plate 42 preferably of aluminum or the like is snugly fitted in the bore of sleeve 13 immediately below the bearing 17, and has an enlarged central opening 45 loosely surrounding shaft 19 in spaced relation thereto.

The plate 42 has an internally threaded bore 43 which receives the threaded end of the grease fitting 18, thereby securing the plate in position. An upwardly inclined passage 44 intersects passage 43 thereby establishing communication between the fitting 18 and the space between the baffle or plate 42 and the bearing.

Grease supplied to fitting 18 therefore is first applied to upper bearing 17 and thence is supplied by hole 45 to the lower bearing.

From the foregoing description, it is believed that the construction, operation and advantages of the present invention will be readily understood and appreciated by those skilled in the art. Minor changes are contemplated such as fall within the scope of the invention as claimed.

What I claim is:

1. In a lawn mower, a sleeve having a bearing assembly carried by one end thereof and a member slidably carried by the other end thereof, a second bearing assembly carried by said member, a shaft journaled in said bearing assemblies, driving means on said shaft for rotating the same, means for axially adjusting said shaft relative to said driving means and to one of said bearing assemblies.

2. In a lawn mower, a sleeve having a bearing assembly carried by one end thereof and a member slidably carried by the other end thereof, a second bearing assembly carried by said member, a shaft journaled in said bearing assemblies, driving means on said shaft for rotating the same, means for axially adjusting said shaft relative to said driving means and to one of said bearing assemblies, said member constituting a second sleeve.

3. In a lawn mower, a sleeve having a bearing assembly carried by one end thereof and a member slidably carried by the other end thereof, a second bearing assembly carried by said member, a shaft journaled in said bearing assemblies, driving means on said shaft for rotating the same, means for axially adjusting said shaft relative to said driving means and to one of said bearing assemblies, said member constituting a second sleeve, said second bearing assembly being secured to the end of said second sleeve at the end thereof which is remote from the first-mentioned end of said first-mentioned sleeve.

4. In a lawn mower, a sleeve having a bearing assembly carried by one end thereof and a member slidably carried by the other end thereof, a second bearing assembly carried by said member, a shaft journaled in said bearing assemblies, driving means on said shaft for rotating the same, means for axially adjusting said shaft relative to said driving means and to one of said bearing assemblies, said second bearing assembly being non-slidably but rotatably secured to said shaft and to said member.

5. In a lawn mower, a sleeve having a bearing assembly carried by one end thereof and a member slidably carried by the other end thereof, a second bearing assembly carried by said member, a shaft journaled in said bearing assemblies, driving means on said shaft for rotating the same, means for axially adjusting said shaft relative to said driving means and to one of said bearing assemblies, said first-mentioned bearing assembly being non-slidably secured to said sleeve and slidable upon said shaft.

6. In a lawn mower, a sleeve having a bearing assembly carried by one end thereof and a member slidably carried by the other end thereof, a second bearing assembly carried by said member, a shaft journaled in said bearing assemblies, driving means on said shaft for rotating the same, means for axially adjusting said shaft relative to said driving means and to one of said bearing assemblies, said first-mentioned bearing assembly being non-slidably secured to said sleeve and slidable upon said shaft, said adjusting means comprising a threaded portion on said shaft, a collar adjustable upon said threaded portion and fixedly secured to said first-mentioned bearing assembly, means for non-rotatably locking said collar to said shaft.

7. In a lawn mower, a sleeve having a bearing assembly carried by one end thereof and a member slidably carried by the other end thereof, a second bearing assembly carried by said member, a shaft journaled in said bearing assemblies, a pulley on said shaft for rotating the same, means for axially adjusting said shaft relative to said pulley and to one of said bearing assemblies, said first-mentioned bearing assembly being non-slidably secured to said sleeve and slidable upon said shaft, said adjusting means comprising a threaded portion on said shaft, a collar adjustable upon said threaded portion and fixedly secured to said first-mentioned bearing assembly, means for non-rotatably locking said collar to said shaft, said pulley having a hub, the hub of said pulley being threaded upon said threaded portion and abutting said collar to form said locking means.

LAURENCE J. WINCHELL.

REFERENCES CITED

The following references are of record in the file of this patent:

UNITED STATES PATENTS

| Number | Name | Date |
| --- | --- | --- |
| 1,335,040 | Burrows | Mar. 30, 1920 |
| 1,642,068 | Hart | Sept. 13, 1927 |
| 2,210,217 | Kahn | Aug. 26, 1940 |
| 2,221,457 | Pope et al. | Nov. 12, 1940 |
| 2,485,984 | Newman | Oct. 25, 1949 |